United States Patent
Klafke et al.

(10) Patent No.: US 9,955,756 B2
(45) Date of Patent: May 1, 2018

(54) SHELL ELEMENT FOR THE BUCKLE COVER OF A SEAT BELT BUCKLE, SEAT BELT BUCKLE AND METHOD FOR PRODUCING A SHELL ELEMENT

(75) Inventors: Ulrich Klafke, Kirchlinteln (DE); Mario Eckmann, Verden (DE); Ole Scharnberg, Hamburg (DE); Jens Albrecht, Hamburg (DE); Sandra Kleinke, Hamburg (DE); Wolf Ulrich Wachter, Elmshorn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 933 days.

(21) Appl. No.: 13/575,515

(22) PCT Filed: Jan. 26, 2011

(86) PCT No.: PCT/EP2011/000349
§ 371 (c)(1),
(2), (4) Date: Oct. 10, 2012

(87) PCT Pub. No.: WO2011/092006
PCT Pub. Date: Aug. 4, 2011

(65) Prior Publication Data
US 2013/0022767 A1    Jan. 24, 2013

(30) Foreign Application Priority Data
Jan. 27, 2010 (DE) .......................... 10 2010 005 795

(51) Int. Cl.
*A44B 11/25* (2006.01)
*B32B 1/00* (2006.01)

(52) U.S. Cl.
CPC ...... *A44B 11/2546* (2013.01); *A44B 11/2503* (2013.01); *A44B 11/2507* (2013.01);
(Continued)

(58) Field of Classification Search
CPC ............ A44B 11/2503; A44B 11/2507; A44B 11/246; A44B 11/2549; A44B 11/2511;
(Continued)

(56) References Cited

U.S. PATENT DOCUMENTS 3,624,182 A * 11/1971 Kubota ......................... 525/230
3,944,766 A * 3/1976 Wood ..................... 200/61.58 B
(Continued)

FOREIGN PATENT DOCUMENTS

CN 1101244 A 4/1995
CN 1208590 A 2/1999
(Continued)

OTHER PUBLICATIONS

ISR for PCT/EP2011/000349 dated Apr. 29, 2011.

*Primary Examiner* — Walter B Aughenbaugh
(74) *Attorney, Agent, or Firm* — Hauptman Ham, LLP

(57) ABSTRACT

A shell element for the buckle cover of a seat belt buckle is disclosed. The shell element comprises a base body made of a hard elastomer and an outer and an inner surface. So that when the buckle cover bears against a further vehicle element with a hard surface, no wear and no undesirable noise is generated and so that the seat belt buckle permanently has attractive visual and haptic properties, a further element made of a soft elastomer is directly connected to the base body and is connected thereto by a material and/or positive connection, said further element forming at least one part of the outer surface of the shell element.

36 Claims, 4 Drawing Sheets

(52) U.S. Cl.
CPC ....... *A44B 11/2511* (2013.01); *A44B 11/2549* (2013.01); *A44B 11/2576* (2013.01); *B32B 1/00* (2013.01); *Y10T 428/1352* (2015.01); *Y10T 428/1386* (2015.01)

(58) Field of Classification Search
CPC .. A44B 11/2576; B32B 1/00; Y10T 428/1386
USPC .................. 428/35.7–35.9, 36.4, 36.8–36.92
See application file for complete search history.

(56) References Cited

U.S. PATENT DOCUMENTS

| | | | |
|---|---|---|---|
| 5,537,725 | A | 7/1996 | Takahashi |
| 7,716,795 | B2* | 5/2010 | Versellie et al. ............. 24/593.1 |
| 8,955,204 | B2* | 2/2015 | Scharnberg et al. ........... 24/642 |
| 2002/0040515 | A1 | 4/2002 | Uchara et al. |
| 2003/0110605 | A1* | 6/2003 | Nishida et al. ................ 24/615 |
| 2003/0233762 | A1* | 12/2003 | Blackman et al. ............. 33/769 |
| 2004/0003486 | A1* | 1/2004 | Dingman ............ A44B 11/2511 24/177 |
| 2006/0090312 | A1 | 5/2006 | Ichida et al. |
| 2007/0050953 | A1 | 3/2007 | Versellie et al. |
| 2010/0251523 | A1* | 10/2010 | Scharnberg et al. ........... 24/700 |
| 2013/0185957 | A1* | 7/2013 | Tsai ................................. 36/44 |

FOREIGN PATENT DOCUMENTS

| | | |
|---|---|---|
| CN | 1345559 A | 4/2002 |
| CN | 2574457 Y | 9/2003 |
| CN | 1765253 A | 5/2006 |
| CN | 200987408 Y | 12/2007 |
| DE | 10259115 A1 | 7/2004 |
| DE | 202008005748 U1 | 7/2008 |
| DE | 102008063139 A1 | 8/2009 |
| EP | 0305444 B1 | 8/1992 |
| WO | WO2008145274 | * 12/2008 |

* cited by examiner

Fig. 3
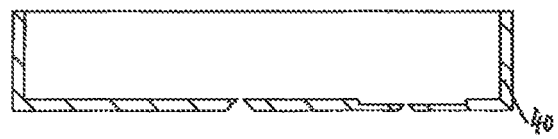
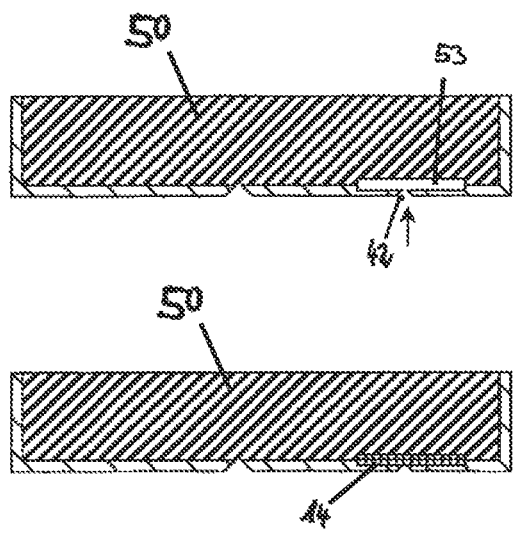
Fig. 4
Fig. 5
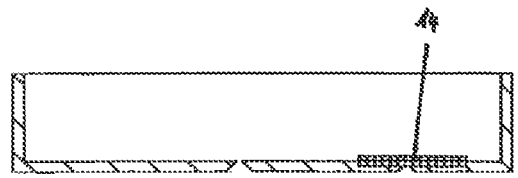
Fig. 6

SHELL ELEMENT FOR THE BUCKLE COVER OF A SEAT BELT BUCKLE, SEAT BELT BUCKLE AND METHOD FOR PRODUCING A SHELL ELEMENT

RELATED APPLICATIONS

The present application is national phase of PCT/EP2011/000349 filed Jan. 26, 2011, and claims priority from German Application Number 10 2010 005 795.9 filed Jan. 27, 2010.

The invention relates to a shell element for the buckle cover of a seat belt buckle comprising such a shell element and a method for producing such a shell element.

Almost every seat belt buckle for a motor vehicle consists of a metal carrier, a release button, a mechanism and a buckle cover, which encloses the carrier and mechanism and consists of at least one shell element. A seat belt buckle comprising two such shell elements is disclosed, for example, in EP 0 305 444 B1. The shell elements generally consist of a hard elastomer, such as for example ABS and are produced in an injection-moulding method.

Frequently, there is the problem that at least one of the two shell elements of the buckle cover bears against the vehicle structure—for example the central console—or against a further buckle cover and during the operation of the motor vehicle rubs against the relevant component or bears thereagainst, which may lead to damage and to troublesome noise. It has, therefore, become known to adhere felt pads or adhesive strips onto a shell element of the buckle cover. A drawback therewith is that when attaching such a felt pad or such an adhesive strip, a further process step is involved which leads to associated costs and that the visual appearance of the buckle cover is generally impaired by the aforementioned measure. Over the lifetime of the motor vehicle, the adhered element is sometimes detached from the buckle cover due to environmental effects, such as for example the action of heat or friction. It is also difficult to ensure the required UV resistance.

Proceeding therefrom, the object of the present invention is to provide a seat belt buckle that, even when the buckle cover thereof bears against a further vehicle element with a hard surface, exhibits no wear and does not generate any undesirable noise, the seat belt buckle permanently having attractive visual and haptic properties.

The shell element according to the invention comprises a base body made of a hard elastomer, to which a further element made of a soft elastomer is connected by a direct material connection, said further element forming at least one part of the outer surface of the shell element.

The shell element is thus present as a one-piece component, which firstly has the required rigidity, and which also partially has resilient properties which counteract the undesirable properties when bearing against a further element. By the one-piece nature of said shell element, a visually and haptically pleasing appearance is obtained and no problems occur with regard to resistance to ageing.

The further element consisting of a soft elastomer is also very well suited for attaching decorative items, such as for example the trade name or logo of the vehicle manufacturer. Moreover, different colours or embossing may be applied.

A preferred method for producing such a shell element is a so-called two-component injection-moulding method, initially the soft elastomer of the further element being injected into the injection mould, and subsequently the hard elastomer of the base body being injected onto the soft elastomer. As a result of this sequence, a very good material contact is produced between the elements of the shell element, namely between the base body and the further element.

The invention is now described in more detail referring to an exemplary embodiment with reference to the figures, in which:

FIGS. 3 to 10 show the method steps for producing such a shell element, using the tool shown schematically in FIG. 2.

Figure 1:
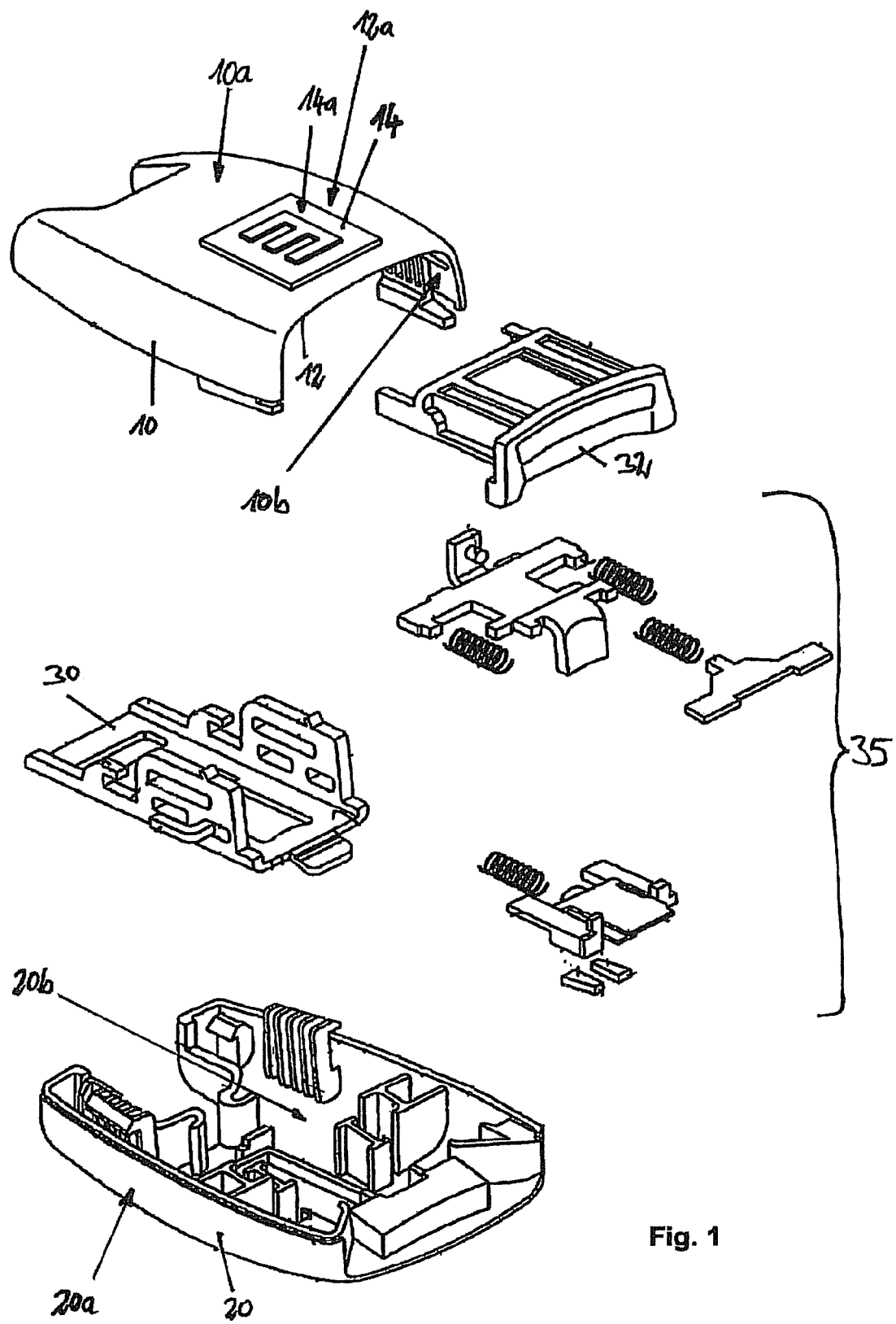
FIG. 1 shows a seat belt buckle in an exploded view

FIG. 1 shows an exploded view of a seat belt buckle. Said seat belt buckle has a carrier 30, a mechanism (generally denoted by the reference numeral 35) fastened to said carrier 30, a release button 32 for actuating this mechanism 35 and two shell elements 10, 20, which encompass the aforementioned elements and together form the buckle cover. Both shell elements have an outer surface 10a, 20a and an inner surface 10b, 20b.

One of the two shell elements, in this case namely the second shell element 20, consists entirely of a hard elastomer, preferably of ABS, and is produced in a conventional injection-moulding method.

The other shell element, in this case namely the first shell element 10, consists of a base body 12 made of a hard elastomer, preferably of the same hard elastomer as the second shell element 20 and of a further element 14 which is produced from a soft elastomer, such as for example TPU (thermoplastic polyurethane) or TPE (thermoplastic elastomer). This further element 14 forms a part of the outer surface 10a of the first shell element 10. In this case the surface 14a of the further element 14 is raised above the surface 12a of the surrounding base body 12 of the first shell element 10. As is further derived from FIG. 1, the further element 14 bears an emblem, which in this case is symbolised by a large "E". The surface of this emblem may be raised above the surrounding surface 14a of the further element 14, or it may be recessed relative thereto.

The base body 12 and the further element 14 are connected together by a direct material connection which is achieved by the first shell element 10 being produced in a two-component injection-moulding method, as is described in more detail hereinafter with reference to FIGS. 2 to 10. In this connection, the shape of the first shell element 10 is shown in a very stylised manner.

Figure 2:
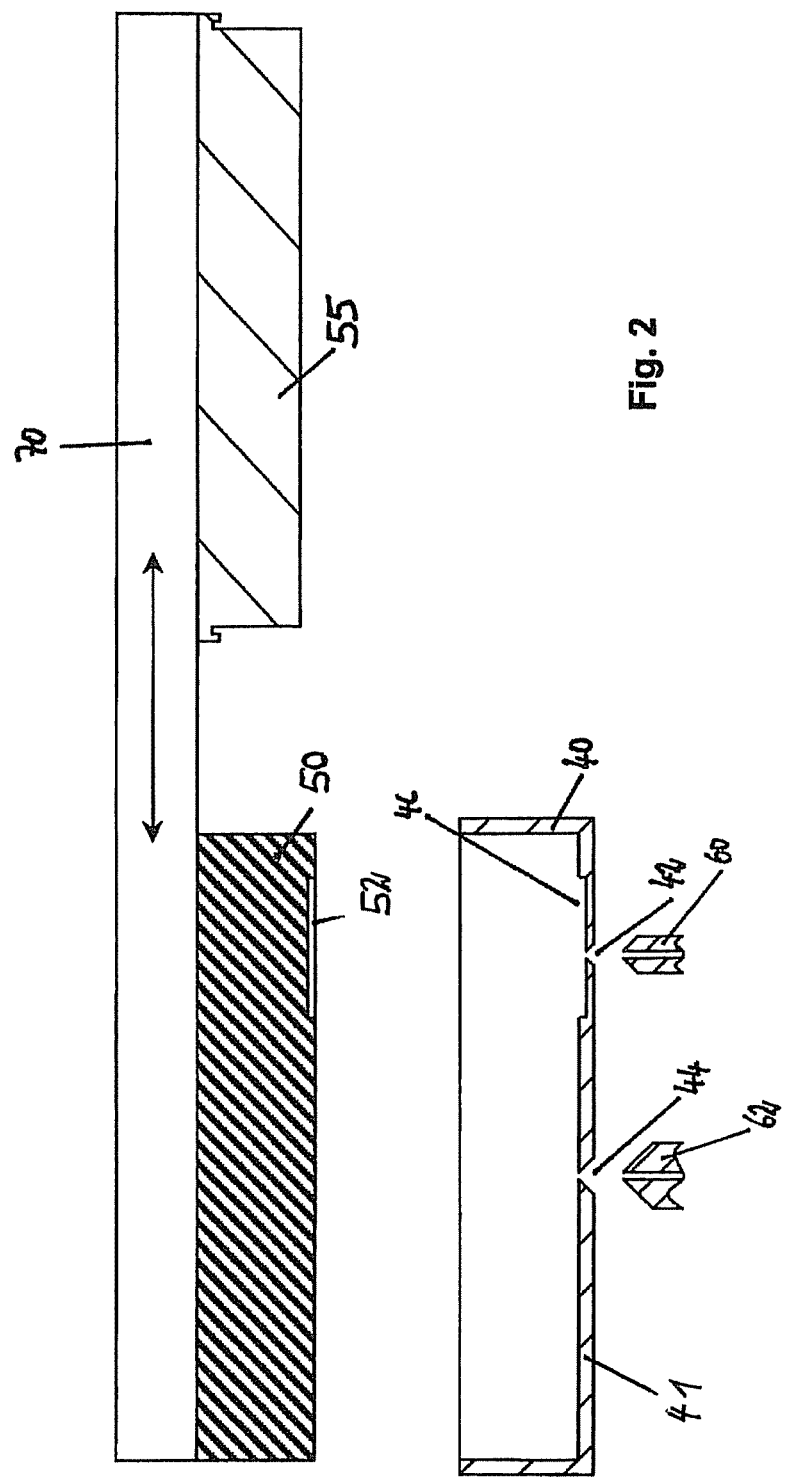
FIG. 2 shows a schematic view of a tool for producing a shell element.
Figure 7:
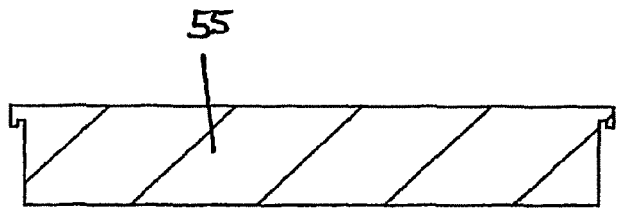
Figure 8:
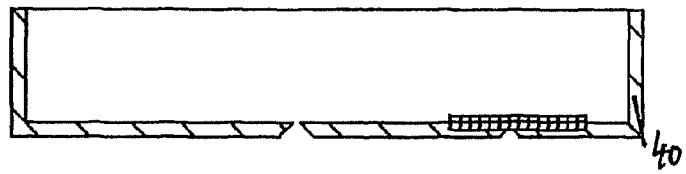
Figure 8:
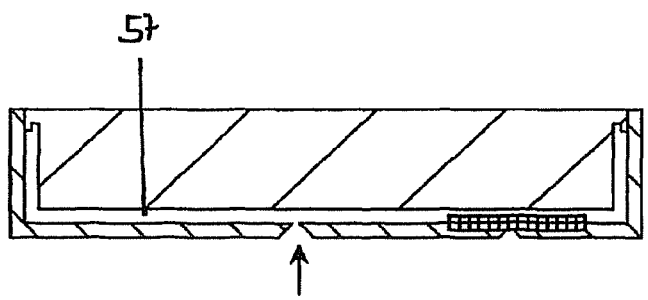
Figure 9:
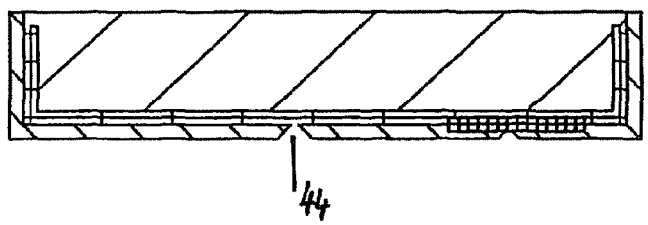

In FIG. 2, a tool is shown with which a shell element 10, as has been described above, may be produced. The tool has a tool half 40 on the gate side and two tool halves 50 and 55 remote from the gate. The two tool halves 50, 55 remote from the gate cooperate successively with the tool half 40 on the gate side, so that a relative displaceability has to be provided between the tool halves 40 on the gate side and the two tool halves 50, 55 remote from the gate. In the exemplary embodiment shown, the two tool halves 50, 55 remote from the gate are arranged on a common carrier 70 which may be a rotary table, for example.

The tool half 40 on the gate side has two runners 42, 44, which extend into the base 41 of the tool half on the gate side, and to which in each case an injection nozzle 60, 62 is associated. In this case, the first runner 42 serves for injecting a soft elastomer and the second runner 44 serves for injecting a hard elastomer. The first runner 42 discharges into a first recess 46 of the base 41 of the tool half 40 on the gate side.

The first tool half 50 remote from the gate fills the tool half 40 on the gate side almost completely, but has a second recess 52 which when the tool is closed opposes the first recess 46. The second tool half 55 remote from the gate, together with the tool half 40 on the gate side, substantially defines the shape of the base body 12 of the first shell element.

FIG. 3 shows a first operating position of the tool described above. In this case, the first tool half 50 remote from the gate opposes the tool half 40 on the gate side. After closing the tool (FIG. 4) the two recesses 46, 52 together form a first cavity 53 into which a soft elastomer is injected (represented by the arrow in FIG. 4) through the first runner 42 (FIG. 5). After opening the tool, the further element 14 consisting of the aforementioned soft elastomer, remains on the base of the tool half 40 on the gate side (FIG. 6).

After moving the two tool halves remote from the gate, the second tool half 55 remote from the gate opposes the tool half 40 on the gate side (FIG. 7) and the tool is closed again. In this case, a further cavity 57 (see FIG. 8) is formed between the two tool halves which defines the shape of the base body 12, the further element 14 protruding into the cavity formed or forming at least one part of its wall.

Now the selected hard elastomer is injected into the further cavity 57 through the second runner (FIG. 8), so that the base body 12 is formed (FIG. 9), the hard elastomer partially encompassing the further element 14, or being at least directly adjacent to a portion of the further element 14, whereby a material-flow connection is produced. By the selected sequence—first the soft elastomer and then the hard elastomer—a good material connection is ensured.

Figure 10:
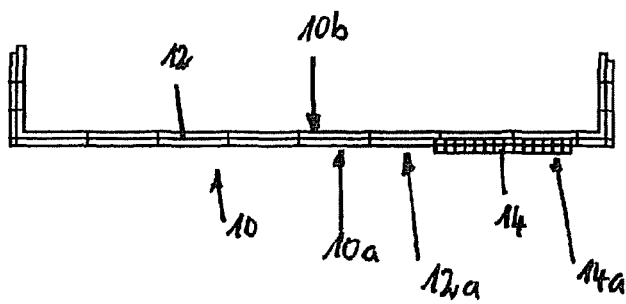

FIG. 10 shows the unmoulded shell element 10.

In an exemplary embodiment, there is a device, comprising a seatbelt buckle cover, including a shell assembly comprising a first component that is a base body having an exterior surface and an interior surface, the first component being made of a hard elastomer, a second component made of a soft elastomer directly connected to the first component on the exterior surface via at least one of a material connection or a positive connection, and a seat belt buckle mechanism, wherein the first component is a first shell element and the second component is a second shell element, and the first shell element and the second shell element collectively envelope the seat belt buckle mechanism.

LIST OF REFERENCE NUMERALS

10 first shell element
10*a* outer surface
10*b* inner surface
12 base body
12*a* outer surface of the base body
14 further element
14*a* surface of the further element
20 second shell element
20*a* outer surface
20*b* inner surface
30 carrier
32 release button
35 mechanism
40 tool half on the gate side
42 first runner
44 second runner
46 first recess
50 first tool half remote from the gate
52 second recess
53 first cavity
55 second tool half remote from the gate
57 second cavity
60 first injection nozzle
62 second injection nozzle

The invention claimed is:

1. A seatbelt buckle comprising:
   a seatbelt buckle cover, including:
      a first shell element and a second shell element,
      wherein the first shell element comprises a base body made of a hard elastomer and having an outer and an inner surface, wherein a further element made of a soft elastomer is directly connected to the base body and is connected thereto by at least one of a material or a positive connection, said further element forming at least one part of the outer surface of the first shell element
      wherein the first shell element and the second shell element are configured to collectively envelope a seat belt buckle mechanism.

2. Seatbelt buckle according to claim 1, wherein the surface of the further element protrudes from the surrounding outer surface of the base body.

3. Seatbelt buckle according to claim 1, wherein the further element protrudes into the base body.

4. The seatbelt buckle of claim 1 comprising the seat belt buckle mechanism, wherein the positive connection is a mechanical connection.

5. The seatbelt buckle of claim 1, wherein:
   the hard elastomer is ABS; and
   the soft elastomer is at least one of TPU or TPE.

6. The seatbelt buckle of claim 1, wherein:
   the hard elastomer has a hardness corresponding to that of ABS; and
   the soft elastomer has a hardness corresponding to that of at least one of TPU or TPE.

7. The seatbelt buckle of claim 1, wherein:
   the hard elastomer has a hardness corresponding to about that of ABS; and
   the soft elastomer has a hardness corresponding to about that of at least one of TPU or TPE.

8. The seatbelt buckle of claim 1 comprising the seat belt buckle mechanism; and wherein
   the first shell element and the second shell element collectively envelope the seat belt buckle mechanism.

9. The seat belt buckle of claim 8, wherein:
   the buckle cover establishes an exterior of the seat belt buckle.

10. The seatbelt buckle of claim 1, wherein the seat belt buckle mechanism is configured to receive a tongue portion of a seat belt therein.

11. The seatbelt buckle of claim 1, wherein the direct connection is the material connection.

12. Seatbelt buckle according to claim 1, wherein the seatbelt buckle is configured such that the base body and the further element remain connected during unbuckling of the seat belt buckle.

13. Seatbelt buckle according to claim 1, wherein the further element is materially connected to the base body, and the further element is the topmost component of the shell element.

14. The seatbelt buckle of claim 8, wherein the seat belt buckle mechanism is configured to receive a tongue portion of a seat belt therein.

15. A seatbelt buckle comprising:
a seat belt buckle mechanism, and
a seatbelt buckle cover, including:
   a shell assembly comprising a first shell and a second shell, wherein the first shell and the second shell collectively envelope the seat belt buckle mechanism,
   wherein the first shell has an outer surface and an inner surface, and the first shell is made by the following actions:
      injection of a soft elastomer into an injection mould which at this time has the negative shape of a further element;
      alteration of the shape of the injection mould so that together with the further element it has the negative shape of a base body; and
      injection of a hard elastomer into the injection mould, so that the hard elastomer is injected onto the soft elastomer;
   wherein the soft elastomer of the further element forms at least one part of the outer surface of the first shell.

16. The seatbelt buckle of claim 15, wherein the first shell is made by a method that is a multi-component injection-moulding method.

17. The seatbelt buckle of claim 15, wherein:
the hard elastomer is ABS; and
the soft elastomer is at least one of TPU or TPE.

18. The seatbelt buckle of claim 15, wherein:
the hard elastomer has a hardness corresponding to that of ABS; and
the soft elastomer has a hardness corresponding to that of at least one of TPU or TPE.

19. The seatbelt buckle of claim 15, wherein:
the hard elastomer has a hardness corresponding to about that of ABS; and
the soft elastomer has a hardness corresponding to about that of at least one of TPU or TPE.

20. The seatbelt buckle of claim 17, wherein the soft elastomer is connected to the hard elastomer by a positive connection, and wherein the positive connection is a mechanical connection.

21. The seatbelt buckle of claim 15, wherein the seat belt buckle mechanism is configured to receive a tongue portion of a seat belt therein.

22. A seatbelt buckle comprising:
a seat belt buckle mechanism, and
a seatbelt buckle cover, including:
   a shell assembly comprising a first shell element and a second shell element,
   wherein the first shell element comprises:
      a first component that is a base body having an exterior surface and an interior surface, the first component being made of a hard elastomer;
      a second component made of a soft elastomer directly connected to the first component on the exterior surface via at least one of a material connection or a positive connection,
   wherein the first shell element and the second shell element collectively envelope the seat belt buckle mechanism.

23. The seatbelt buckle of claim 22, wherein the second component protrudes into the first component.

24. The seatbelt buckle of claim 22, wherein the second component covers a minority of the external surface area of the first component.

25. The seatbelt buckle of claim 22, wherein:
the hard elastomer is ABS; and
the soft elastomer is at least one of TPU or TPE.

26. The seatbelt buckle of claim 22, wherein:
the hard elastomer has a hardness corresponding to that of ABS; and
the soft elastomer has a hardness corresponding to that of at least one of TPU or TPE.

27. The seatbelt buckle of claim 22, wherein:
the hard elastomer has a hardness corresponding to about that of ABS; and
the soft elastomer has a hardness corresponding to about that of at least one of TPU or TPE.

28. The seatbelt buckle of claim 22, wherein the second component is connected to the first component by the positive connection, and wherein the positive connection is a mechanical connection.

29. The seat belt buckle of claim 22, wherein:
the buckle cover establishes an exterior of the seat belt buckle.

30. The seatbelt buckle of claim 22, wherein the seat belt buckle mechanism is configured to receive a tongue portion of a seat belt therein.

31. The seatbelt buckle of claim 22, wherein the second component made of the soft elastomer is directly connected to the first component on the exterior surface via the material connection.

32. The seatbelt buckle of claim 22, wherein:
the seatbelt buckle includes a carrier, wherein the carrier is located inside the seatbelt buckle cover.

33. The seatbelt buckle of claim 22, wherein:
a seatbelt release is movably supported by the seatbelt buckle cover.

34. The seatbelt buckle of claim 22, wherein the exterior surface of the first component is the exterior surface of the seatbelt buckle cover.

35. A seatbelt buckle cover for covering a seat belt buckle mechanism comprising:
a shell assembly comprising a first shell and a second shell, wherein the first shell and the second shell collectively envelope the seat belt buckle mechanism,
wherein the first shell has an outer surface and an inner surface, and the first shell is made by the following actions:
   injection of a soft elastomer into an injection mould which at this time has the negative shape of a further element;
   alteration of the shape of the injection mould so that together with the further element it has the negative shape of a base body; and
   injection of a hard elastomer into the injection mould, so that the hard elastomer is injected onto the soft elastomer;
wherein the soft elastomer of the further element forms at least one part of the outer surface of the first shell.

36. A seat belt buckle comprising the buckle cover of claim 35 and the seat belt buckle mechanism, wherein the seat belt buckle mechanism is configured to receive a tongue portion of a seat belt therein.

* * * * *